US009530171B2

(12) United States Patent
Pollard et al.

(10) Patent No.: US 9,530,171 B2
(45) Date of Patent: Dec. 27, 2016

(54) FORENSIC AUTHENTICATION SYSTEM AND METHOD

(75) Inventors: Stephen Pollard, Dursley (GB); Guy Adams, Stroud (GB); Steven J. Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 125 days.

(21) Appl. No.: 14/126,604

(22) PCT Filed: Aug. 24, 2011

(86) PCT No.: PCT/US2011/048960
§ 371 (c)(1),
(2), (4) Date: Dec. 16, 2013

(87) PCT Pub. No.: WO2013/028185
PCT Pub. Date: Feb. 28, 2013

(65) Prior Publication Data
US 2014/0169617 A1    Jun. 19, 2014

(51) Int. Cl.
*G06T 1/00*    (2006.01)
*H04N 1/32*    (2006.01)
(52) U.S. Cl.
CPC ......... *G06T 1/0021* (2013.01); *H04N 1/32101* (2013.01); *H04N 2201/323* (2013.01);
(Continued)
(58) Field of Classification Search
None
See application file for complete search history.

(56) References Cited

U.S. PATENT DOCUMENTS 6,567,530 B1 * 5/2003 Keronen et al. ............. 382/100
7,028,188 B1    4/2006 Moore
(Continued)

FOREIGN PATENT DOCUMENTS

EP         0593303 A2    4/1994
WO    WO-2006052316 A2    5/2006
WO    WO-2007020493 A1    2/2007

OTHER PUBLICATIONS

Zhu, Baoshi, Jiankang Wu, and Mohan S. Kankanhalli. "Print signatures for document authentication." In Proceedings of the 10th ACM conference on Computer and communications security, pp. 145-154. ACM, 2003.*

(Continued)

*Primary Examiner* — Vikkram Bali
*Assistant Examiner* — Tracy Mangialaschi
(74) *Attorney, Agent, or Firm* — Dierker & Kavanaugh, P.C.

(57) ABSTRACT

A forensic authentication system includes an imaging device to capture an image of a printed mark and a non-printed area of a substrate directly adjacent to the printed mark, and a processor to run computer readable instructions. The processor can run computer readable instructions to utilize a model to define a substrate region that corresponds with at least a portion of the non-printed area of the substrate directly adjacent to the printed mark; and computer readable instructions to generate a substrate signature for the defined substrate region. Each of the computer readable instructions is embedded on a non-transitory, tangible computer readable medium.

19 Claims, 7 Drawing Sheets

(52) U.S. Cl.
CPC ........... *H04N 2201/3235* (2013.01); *H04N 2201/3236* (2013.01); *H04N 2201/3269* (2013.01); *H04N 2201/3271* (2013.01)

(56) References Cited

U.S. PATENT DOCUMENTS

| 2006/0023935 | A1  | 2/2006  | Wakabayashi |            |
|--------------|-----|---------|-------------|------------|
| 2009/0252434 | A1* | 10/2009 | Zhou        | G06K 9/38  |
|              |     |         |             | 382/276    |
| 2012/0224784 | A1* | 9/2012  | Cohen       | G06T 5/002 |
|              |     |         |             | 382/260    |

OTHER PUBLICATIONS

Kee, Eric, and Hany Farid. "Printer profiling for forensics and ballistics." In Proceedings of the 10th ACM workshop on Multimedia and security, pp. 3-10. ACM, 2008.*

Clarkson, William, et al. "Fingerprinting blank paper using commodity scanners." Security and Privacy, 2009 30th IEEE Symposium on. IEEE, 2009.*

Métois, E., Yarin, P., Salzman, N., & Smith, J. R. (Mar. 2002). FiberFingerprint identification. In Proc. 3rd Workshop on Automatic Identification (pp. 147-154).*

Pollard et al., "Model Based Print Signature Profile Extraction for Forensic Analysis of Individual Text Glyphs", WIFS 2010, Dec. 12-15.

* cited by examiner

FORENSIC AUTHENTICATION SYSTEM AND METHOD

BACKGROUND

The present disclosure relates generally to forensic authentication systems and methods.

Security printing, publishing, and imaging are important components of product differentiation, tracking and tracing, inspection, authenticating, forensics, as well as other anti-counterfeiting initiatives. Security printing involves providing each package with a unique ID, in the form of, for example, a smart label, deterrent or mark. Such unique identifiers may be overt and/or covert, and may contain authenticable data. Thus, such marks are particularly suitable for product track and trace, inspection, and authentication. Image based forensic services have been used to detect and aggregate counterfeits in a supply chain. These services are particularly useful when products do not contain specific security deterrents. In particular, these services analyze printing that has occurred on the product in order to investigate the authenticity. For some print technologies, however, there may be insufficient random variation in the print structure to provide a rich enough print signature to obtain the statistical accuracy required for forensic discrimination between printed documents.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
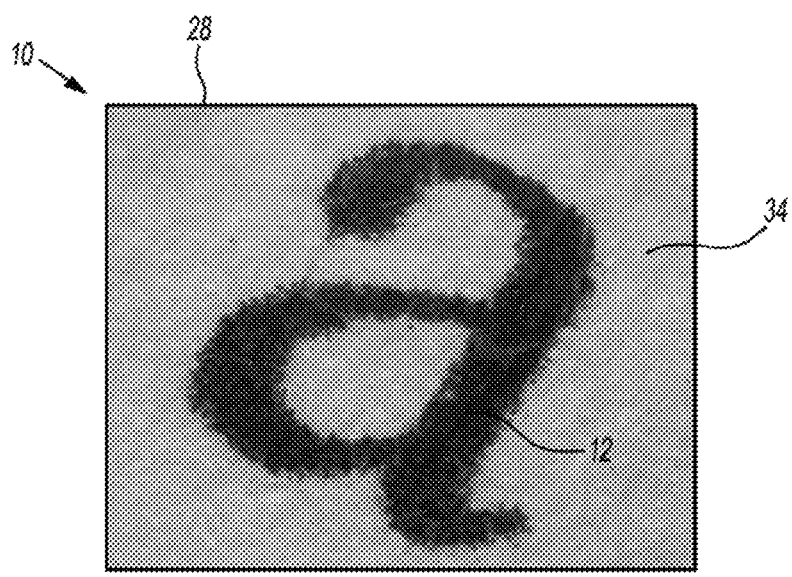
FIGS. 1A through 1C depict an example of A) an image of a printed glyph; B) an example of a model modeled on and derived from the printed glyph shown in FIG. 1A; and C) another example of a model modeled on and derived from the printed glyph shown in FIG. 1A.

In addition to or as an alternative to analyzing a printed forensic mark, it has been found that the analysis of the substrate surrounding a single printed item or multiple printed items may be used for forensic inspection. A forensic inspection may include a comparison that is used to determine if the forensic mark under investigation is the exact same unique item that was previously printed. Forensic inspection allows highly statistically significant levels of authentication to be achieved. Substrate analysis enables the substrate to be used as a security mechanism to prevent and/or identify counterfeiting and/or copying.

In the examples disclosed herein, a model of a printed forensic mark is used to identify a region of a substrate (having the forensic mark printed thereon) for forensic inspection. The "forensic mark" may be any glyph or other printed item. In an example, the forensic mark may include letter(s), number(s), symbol(s), shape(s), identification mark(s) (e.g., all or a portion of a 1D or a 2D barcode), fiducial mark(s) (e.g., index line(s) or point(s)), or combinations thereof.

The "model" consists of a priori information that is required to accurately locate the printed forensic mark within a captured image that includes the printed forensic mark. An example of the model includes an explicit geometrical outline of a character glyph as defined by a sequence of control/contour points and line sections, such as the Bezier curves used in the definition of outline fonts. Another example of the model includes an implicit geometrical outline of parametric shapes, such as squares, discs and ellipses. Still another example of the model includes non-payload indicia of 2D barcodes, such as DataMatrix and QR-codes (i.e., the constant parts of the description of the barcode that are used specifically for identification and localization purposes). The description of FIGS. 1 through 5 herein is focused on forensic marks based on character glyphs and explicit geometrical outline models, but it is to be understood that the scope of the disclosure extends to other possible sources of forensic marks and appropriately defined models (including the examples mentioned above). Furthermore, it is to be understood that a model may be created for any forensic mark. For example, a model may be generated for every alphanumeric character in every known font.

An outline model of a glyph is defined herein as a sequence of points (e.g., x, y coordinates) defining the outer edge of the glyph. In some examples, the sequence can be uniformly spaced around the glyph. In other examples, the sequence can be non-uniformly spaced around the glyph. For example, more points may be used at areas around the glyph having higher curvature than at areas around the glyph having less or no curvature. As will be described further below, an example of the model disclosed herein and an image of a printed mark may advantageously be used in a model fitting process that identifies/registers a suitable substrate region for subsequent analysis.

A substrate signature may be extracted from the identified substrate region, and this signature may be used for multiple purposes, including forensic inspection or modification of subsequently printed materials. For example, the substrate signature can be compared between multiple captures of the same document in order to prove that the physical document is in fact the same. The substrate signature may also be encoded within a subsequently printed identifying mark so that the authenticity of the document can be checked directly against the substrate signature rather than requiring external storage and recovery of the previously extracted signature. Still further, the substrate signature may be used to modify subsequently printed content on the same physical paper (e.g., in accordance with U.S. Pat. No. 7,028,188) to ensure that modifications to the document can be identified. The aspects of the substrate that can generate a substrate signature include, for example, microscopic surface texture and directional illumination.

The explicit geometrical outline model of a forensic mark may be derived directly from an electronic description of the forensic mark, such as the outline font of a character glyph. In some instances, however, this technique may not provide a suitable model of the forensic mark as it is actually printed. As such, in some instances, the explicit geometrical outline model can itself be derived from one or more examples of the printed forensic mark. For example, a glyph outline model may be derived from multiple images of a printed glyph. In still other instances, the print process itself can be simulated so that an estimated model of the printed forensic mark can be generated electronically. In any of these examples, the model may be generated using suitable hardware and computer readable instructions that are executable via the hardware. The computer readable instructions are embedded on a non-transitory, tangible computer readable medium.

Figure 1B:
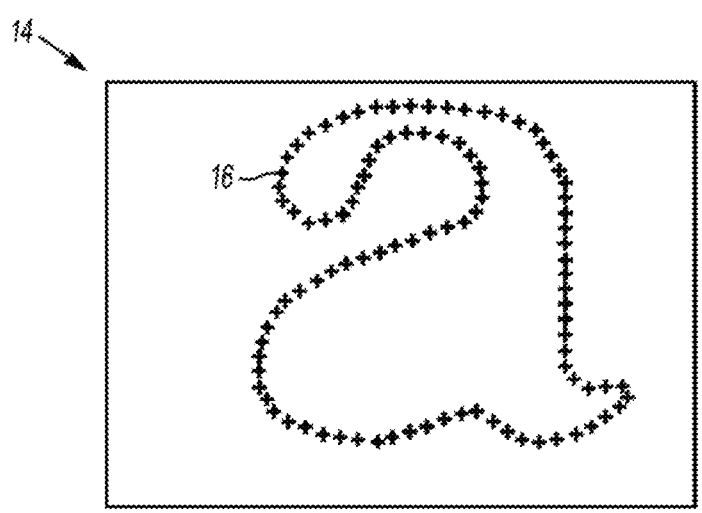

An example of an image 10 of a printed glyph 12, to be used as a forensic mark, is depicted in FIG. 1A, and an example of the model 14 of the glyph is depicted in FIG. 1B. The printed glyph 12 in the example of FIG. 1A is a Times Roman 12-point "a", and the image 10 is a 900×800 (wide×tall) image of the printed glyph 12 as captured by an example of the imaging device (discussed below).

The model 14 shown in FIG. 1B consists of a set of contour points 16 uniformly spaced around the outer edge of the glyph. In this example, each contour point 16 is an x, y coordinate. Together, the contour points 16 define the outer edge of the glyph. The number of contour points 16 used may depend, at least in part, on the size of the glyph and the desired spacing between the contour points 16. In an example, the Times Roman 12-point "a" has anywhere from 100 contour points to 2000 contour points. In another example, the Times Roman 12-point "a" has anywhere from 1000 contour points to 2000 contour points. The model 14 shown in FIG. 1B is an example of a relatively simple model 14 that contains 100 contour points 16.

Figure 1C:
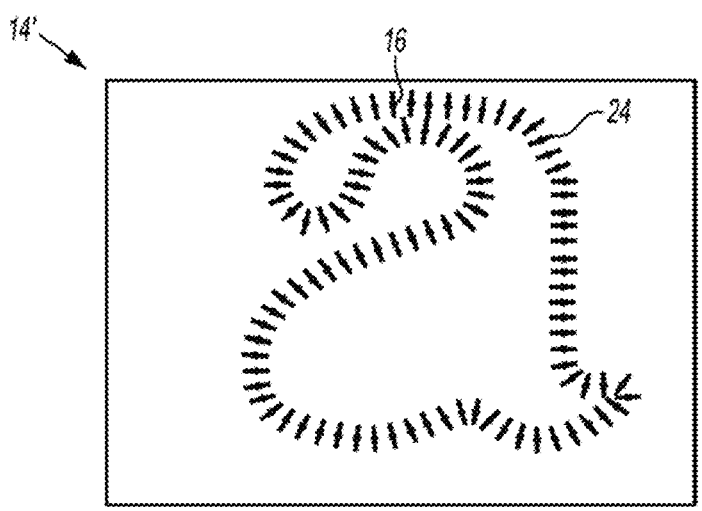

The model 14' shown in FIG. 1C is the model 14 including the contour points 16 defining the outer edge of the glyph and also associated unit normal vectors 24. In this example, a unit normal vector 24 is generated for each contour point 16. It is to be understood that the vectors 24 may not be part of the original model 14, and may be generated after the model 14 is superimposed on an image 10.

Once created, the model(s) 14, 14' may be stored in a model registry or repository 18. As such, the model registry 18 is a source of suitable models 14, 14' for performing forensic authentication using examples of the method disclosed herein. The model registry 18 may be part of the forensic authentication system 20 disclosed herein and shown in FIG. 2. In an example, the model registry 18 may be a database or a cloud computing component that is part of, or is associated with a computing system 22 that performs the substrate analysis. This computing system 22 will now be described in reference to FIG. 2.

Figure 2:
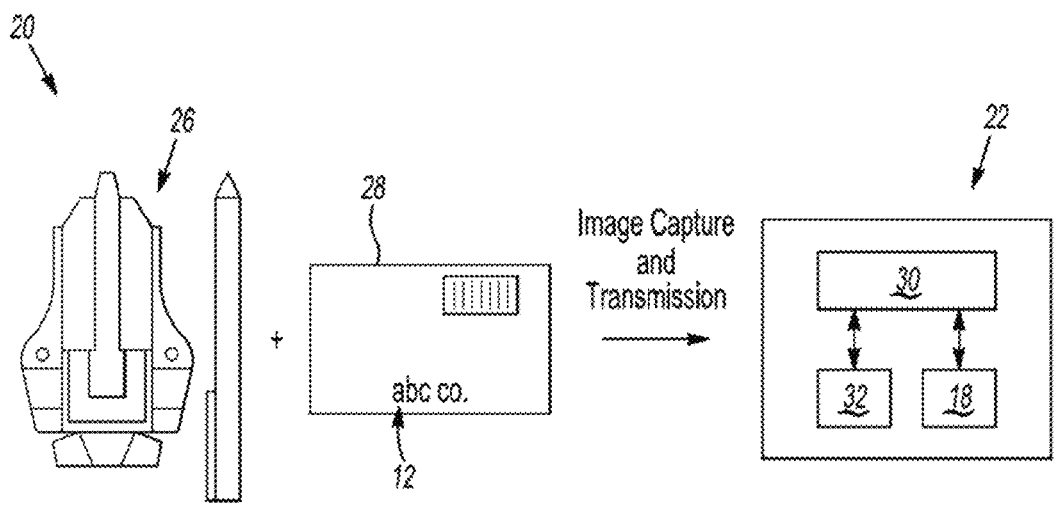
FIG. 2 is a schematic diagram depicting an example of a forensic authentication system.

As shown in FIG. 2, an example of the forensic authentication system 20 includes a suitably high resolution imaging device 26, the printed glyph 12 (one example of the forensic marks disclosed herein) on a substrate 28, and the computing system 22.

Prior to printing the forensic mark (e.g., glyph 12) on the substrate 28, the forensic mark may be generated using suitable application(s) capable of creating characters, graphics, or other items to be printed, such as computer readable instruction based programs, Internet enabled programs, or the like. The application(s) for generating the forensic mark may be run by, e.g., a processor. Non-limiting examples of such applications/programs include Adobe® Photoshop, Quark® 3D Box Shot, barcode labeling software (e.g., Tattoo ID by ISD®), or other like programs. It is to be understood that the forensic mark may be part of a mark, word, picture, etc. containing other printed items.

Once the forensic mark is generated, it is printed on the substrate 28 using a desirable printer. Examples of suitable printing techniques include inkjet printing (e.g., thermal, piezoelectric, continuous, etc.), laserjet printing (e.g., thermal laserjet), electrophotographic printing, gravure printing, flexographic printing, offset printing, screen printing, dot matrix printing, or any other suitable printing technique that can print the characters, graphics, etc. selected or generated for the forensic mark(s).

The substrate 28 may be any suitable substrate, and may be part of an object, a product, document or package. A package may be any unit for containing a document or product, any unit for displaying a product, or any unit for identifying a branded good. Examples of the substrate 28 include coated and uncoated papers, plastics, or any other substrate capable of having ink printed thereon. Examples of objects include labels, anti-tamper strips (which tear when removal is attempted, thereby damaging both visual and physical aspects of any deterrents thereon), tickets, coupons, and other single-used items, boxes, bags, containers, clamshells, bands, tape, wraps, ties, bottles, vials, dispensers, inserts, other documents, or the like, or combinations thereof. As illustrated in FIG. 2, the substrate 28 may include multiple marks, such as the shapes of the barcode and the various alphanumeric characters (including glyph 12). The substrate 28 may have the marks printed directly thereon (printed on the surface of the substrate 28) or indirectly thereon (i.e., printed on another substrate that is attached or can be attached to the substrate 28).

The printed forensic mark (e.g., glyph 12) may then be captured with the imaging device 26. As such, the imaging device 26 that is part of the system 20 may be used to capture an image 10 of the glyph 12 that is printed on the substrate 28, where the image 10 may be used in a subsequent substrate analysis and forensic authentication method. The desired forensic mark should be in the captured image, and the forensic mark should be large enough to conceivably vary as a function of angle (e.g., the captured image of the forensic mark is not a single pixel in size). As examples, a single alphanumeric character or a subset of the non-payload indicia of a 2D barcode may be sufficiently captured images.

In some examples, the imaging device 26 is a suitably high resolution imaging device that includes hardware that is able to capture an image that is overwhelmingly similar to the original image (e.g., the printed glyph). More particularly, the size of the pixels on the image sensor in the device 26 corresponds to the size of the pixels imaged on the surface of a substrate. As used herein, suitably high resolution means above about 5,000 dpi or about 5 µm of the document per pixel of the image. The images captured via this device 26 provide forensic evidence (associated with some probability) that is generally not achievable using other imaging devices, such as desktop scanners and mobile cameras. Examples of the suitably high resolution imaging device 26 include a unity magnification, 1 to 5 micron optical resolution USB CMOS imaging device (e.g., 1:1 magnification, 3.2 micron resolution Dyson relay lens-based 3 mega-pixel USB CMOS imaging device), USB microscopes, and iDetector™ (from GSSC), with varying degrees of resolution. The suitably high resolution imaging device 26 may capture a relatively small area (e.g., 5×5 mm) at high resolution to achieve a suitable image. However, it is to be understood that multiple frames or devices may be used simultaneously to create a much larger image (i.e., in pixels of height or width).

It is to be understood that the forensic marks printed and the forensic mark images captured are not limited to being monochrome. For example, microscopic spatial aberrations (or parasitics) in color may exist in the same way as aberrations exist in a monochrome printing process. Furthermore, in a cyan magenta yellow (CMY) printing process, there may be microscopic variations in the registration or alignment of the color planes.

Examples of the computing system 22 include a processor 30, the model registry 18 in communication with the processor 30, and computer readable instructions 32 embedded on non-transitory, tangible computer readable media. The processor 30 is equipped to read and execute the computer readable instructions 32. The computing system 22 may also include a memory (not shown) or other hardware and/or software components for performing the substrate analysis disclosed herein. While the model registry 18 is shown as being part of the computing system 20, it is to be understood that the model registry 18 may be located remotely from the system 20 performing the analysis, but in selective operative communication therewith.

In some examples, all of the system 20 components may be separate, and may even be part of a cloud or distributed computing system. When part of a cloud or distributed computing system, the system 20 may include a network of interconnected computers and/or other electronic devices (e.g., scanners, printers, etc.), including virtualized and/or redundant processors, banks of processors and/or servers, etc. It is to be understood that the components of the cloud computing network may be implemented in a consolidated location, or portion(s) of the cloud computing network may be implemented at different locations. In one example, the cloud computing network is a virtualized bank of computers (e.g., processors and/or servers) that enables Internet-based computing (through which the substrate analysis program can be accessed). Computer readable instructions and data associated with the cloud computing network are stored on servers and their associated memory. In some other examples, the computing system 20 may be located on a mobile device, thus enabling a user to use the system 20 without having to connect to another infrastructure. The mobile device could stare (and subsequently access) the recovered signature in the memory of the device or on a substrate 28 in printed form. Alternatively, the mobile device could upload/download all signatures to/from a cloud database at the end of a predetermined time period (e.g., each day) so that processing is local but multiple devices could be used.

Figure 3:
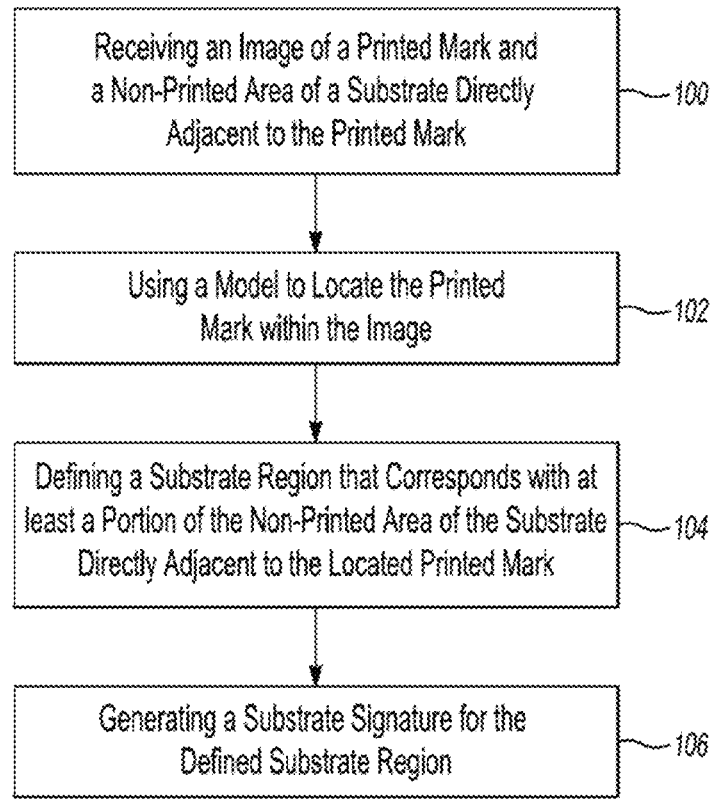
FIG. 3 is a flow diagram depicting an example of a method for performing forensic authentication.

FIG. 3 illustrates an example of the forensic authentication method. When substrate inspection is desirable, an image 10 of a printed glyph 12 is captured using the imaging device 26. It is to be understood that the image 10 includes at least the printed glyph 12 and a non-printed area of the substrate 28 directly adjacent to the printed glyph 12. Briefly referring back to FIG. 1A, the non-printed area of the substrate 28 is labeled 34. This non-printed area 34 includes a predetermined amount of the substrate 28 around the outer edge of the printed glyph 12 that does not have ink printed thereon. The predetermined amount of the substrate 28 making up the non-printed area 34 may have different dimensions at different areas around the printed glyph 12. For example, in FIG. 1A, the non-printed area along the right side of the Times Roman "a" is larger than the non-printed area along the top of the Times Roman "a". Furthermore, the non-printed area may extend as far out from the printed glyph edge as long as there is no ink printed on the area or there is minimal ink splatter on the area. For example, in FIG. 2, the non-printed area 34 surrounding the printed glyph "a" would end prior to reaching the printed glyph "b" on the object 28.

The processor 30 receives the captured image 10, as shown at reference numeral 100 of FIG. 3. The transmission of the image 10 may be accomplished in any desirable manner. For mobile (e.g., wireless) transmissions, the mode of transmission may depend upon the carrier privileges, the mobile connectivity, etc. The imaging device 26 could transfer, either directly or indirectly (e.g., via a cell phone) the image 10 to the processor 30. In another example, the whole system 20 could reside on a single mobile platform (e.g., iPAQ®, iPhone®, etc.) and thus the transmission would be contained between the components of such a device.

The image 10 is received via a computer program (e.g., which includes some computer readable instructions 32) that is capable of receiving images. This program 32 transmits the image 10 to a substrate analysis program (e.g., which also includes computer readable instructions 32), which performs forensic analysis on a defined region of the non-printed area 34 of the substrate 28.

The substrate analysis program includes a robust and accurate way to locate models 14, 14' in captured images 10 (see reference numeral 102 in FIG. 3). Since the model 14, 14' is available a priori, the substrate analysis program selects the model 14, 14' from the model registry 18, and then locates and employs a geometric transformation that bests overlays the model 14, 14' on the printed glyph 12 in the image 10. A generic shape matching algorithm may be used that finds the best fit of the model 14, 14' according to an allowed transformation (e.g., similarity, affine, or perspective plane (i.e., planar homography)). The located and employed geometric transformation superimposes the model 14, 14' on the image 10 of the printed glyph 12 so that the contour points 16 of the model 14, 14' outline the printed glyph 12. An example of the model 14' superimposed on the image 10 of the printed glyph 12 is shown in FIG. 4A.

As shown at reference numeral 104 of FIG. 3, a substrate region is then defined. In an example, the printed glyph 12 having the model 14 or 14' superimposed thereon is used to define a substrate region (an example of which is shown at reference numeral 36 in FIG. 4C). The geometry of the superimposed model 14, 14' on the image 10 provides a frame of reference with respect to which a consistent region 36 of the substrate 28 can be identified, extracted, and processed to generate a substrate signature. The defined substrate region 36 corresponds with at least a portion of the non-printed area 34 of the substrate 28 that is directly adjacent to the printed glyph 12. Any suitable technique may be used to define the substrate region 36. The technique may be performed by executing computer readable instructions 32 that are part of the substrate analysis program.

Figure 4:
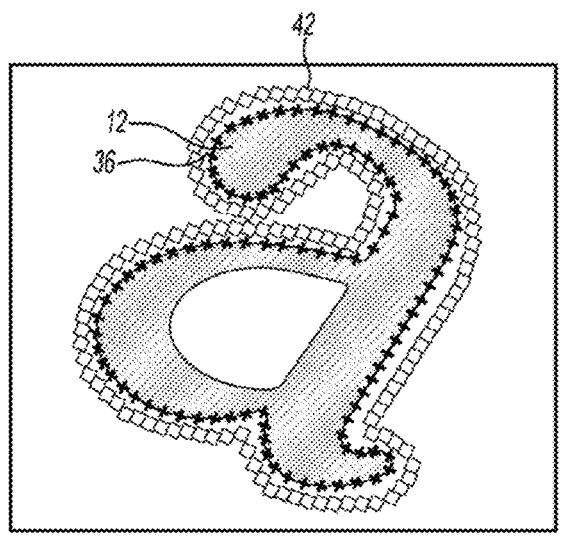
FIG. 4 is a schematic illustration of the model of FIG. 1C superimposed on the image of FIG. 1A with a set of geometric regions defined around the image of the printed glyph.

In an example, the substrate region 36 may be defined using a set of geometric blocks (e.g., square blocks, rectangular blocks, etc.). An example of this is shown in FIG. 4. The geometric blocks 42 may be explicitly defined with respect to the superimposed model 14. The geometric blocks 42 would be external to the glyph 12 (i.e., positioned along the edge of the glyph 12 or along the edge of the vectors 24 as shown in FIG. 4) and thus would be expected to include at least a portion of the non-printed area 34 of the substrate 28. When the substrate region 36 is defined in this manner, the variance of image data in the region 36 may be measured directly to generate a substrate signature therefrom (reference numeral 106 in FIG. 3).

Figure 5A:
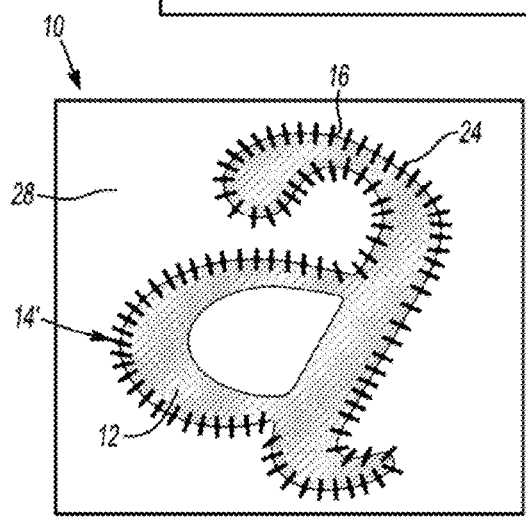
FIGS. 5A through 5D depict A) a schematic illustration of the model of FIG. 1C superimposed on the image of FIG. 1A; B) a schematic illustration of loci generated using the superimposed model on the image; G) an actual representation of a profile image extracted from between the loci along the normal vector for each individual (x, y) contour point of the model; and D) a substrate signature extracted from the profile image shown in FIG. 5C.
Figure 5B:
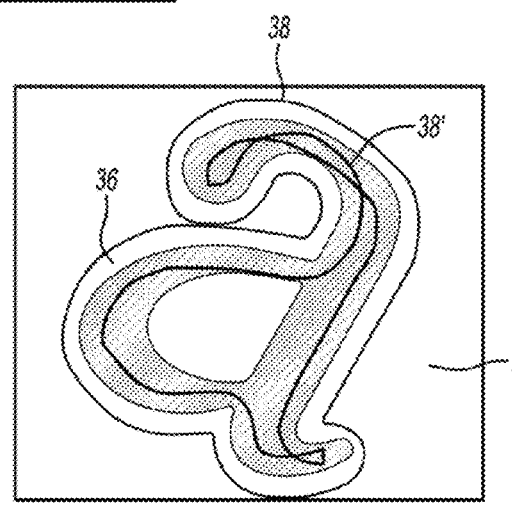
Figure 5C:
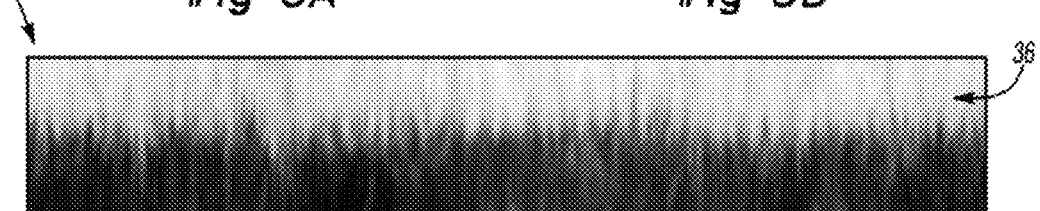

Another example of defining the substrate region 36 is shown in FIGS. 5A through 5C. As shown in these figures, the normal unit vectors 24 of the superimposed model 14' are utilized to define the substrate region 36. In FIG. 5B, loci 38, 38' are generated using the normal unit vectors 24 for each contour point 16. The inner loci 38' connects the inner-most point of each of the normal unit vectors 24, and the outer loci 38 connects the outer-most point of each of the normal unit vectors 24. In this example, a profile image 40 is extracted from the superimposed model 14' on the image 10, as shown in FIG. 5C. The profile image 40 is a region of the image 10 normal to the contour points 16 of the superimposed model 14'. Each column of the profile image 40 corresponds to a sampling on one of the vectors 24 between the loci 38, 38'. The height of the profile image 40 is fixed in proportion to the dimension of the glyph 12 as a whole (e.g., as determined by the mean distance of each contour point 16 in the model 14, 14' from its center of gravity).

During extraction of the profile image 40, it may be desirable to low-pass filter the underlying image 10 using a standard Gaussian convolution kernel. This may advantageously remove imaging noise and avoid sampling artifacts. Sampling artifacts may also be avoided by using a sufficient number of contour points 16 to define the model 14. For example, from 1000 contour points to 2000 contour points may be a sufficient number of contour points 16 for the Times Roman 12-point letter "a" shown herein.

After the profile image 40 is generated, the substrate region 36 is defined as a fixed part of the profile image 40. The fixed part is away from the body of the text of the glyph 12. The fixed part may be a percentage of the height of the profile image 40 that is furthest from the printed glyph 40. For example, if the profile image 40 spans a region "n" pixels on either side of the glyph boundary (where n corresponds to 10% of the glyph dimension), then the outer-most or top 25% of the profile image 40 (i.e., n/2 pixels) should be free from inked regions. This area that is free of ink may become the defined substrate region 36. In rare instances where the complexity of the glyph 12 is such that other parts of the inked glyph 12 fold in on itself and are included in the profile image 40, another fixed part of the profile image that does not include an inked region (i.e., other than the outer-most or top 25% of the profile image 40) may be selected as the defined substrate region 36.

It is believed that other methods (aside from the fixed regions and the orthogonal profile images described herein) of defining the substrate region 36 may also be utilized. For example, when the model is the non-payload indicia of a 2D barcode, the substrate region 36 may be defined in the whitespace outside the edges of the barcode (just beyond where no ink is printed) or the interior space within the non-payload indicia strips.

Once the substrate region 36 is defined, a substrate signature may be generated for/extracted from the substrate region 36. The substrate signature may be generated using a direct image variance method, a grayscale edge summation method, or a method based on identifying and analyzing specific features of the substrate that can be captured by imaging (i.e., a high interest feature identification and bounding method). For the latter method, the specific features include readily and repeatable identified features such as fibers, craters, ridges, and other unpredicted/stochastic deformations in the substrate, which can be identified with high resolution, infrared or other imaging techniques. Such features can be cataloged using image segmentation software that creates connected components, or "regions", that are defined by their bounding boxes (minimum and maximum value in x- and y-direction) and/or polygonal bounds (series of vertices in {x,y} plane) and can be compared relative to a fiducial mark and/or each other for later matching. Later matching may be performed using standard pattern matching (e.g., correlation) means.

Figure 5D:
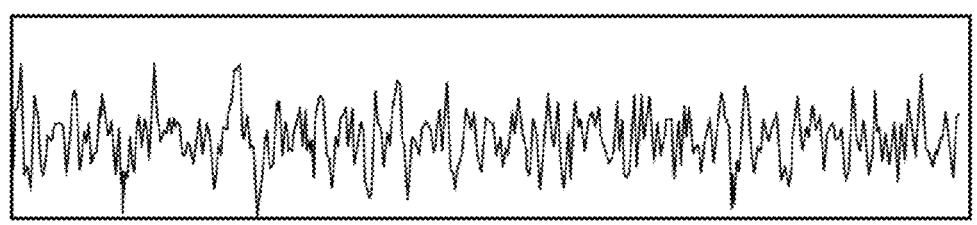

An example of the substrate signature extracted from the substrate region 36 is shown in FIG. 5D. In a specific example, a grayscale metric that combines all the data in the substrate region 36 (which, in this example is the selected portion of the profile image 40) may be used to generate/extract the substrate signature. With this grayscale metric, for each column in the profile image 40, the signature is defined as:

$$\rho_i = \sum_j j w_j e_{ij} / \sum_j w_j |e_{ij}|$$

where $e_{ij}$ is an edge strength corresponding to the digital derivative of the profile image 40 along the column i, and $w_j$ is a windowing function (e.g., a Gaussian with standard deviation ¼ the column height centered on the mid-point of the column). Dividing by a normalizing sum of windowed absolute edge strength results in a measure that achieves robustness to both scene content and illumination variation.

The generated/extracted substrate signature may be used in a variety of applications, including forensic inspection. When performing forensic inspection, the substrate signature itself may be compared with other substrate signatures, or the substrate signature may be divided into intervals so that a shorter code may be obtained for comparative purposes. When utilizing intervals, the substrate signature may be divided into N equally sized sub-regions along its length (i.e., along the profile dimension around the glyph 12). For each sub-region, the variance of the substrate image may be computed. A relatively simple coding can then be obtained by using the mean (or median) variance over all of the sub-regions as a unit value. This coding is referred to herein as substrate variance coding or SVC. The SVC of any two substrates may be compared to provide forensic levels of authentication. An example of how the SVC may be computed and how the SVCs of two substrates may be compared will now be described.

In an example, for each sub-region of the substrate signature, a sum squared error (SSE) of the residual (which is akin to a local variance) may be calculated by $$SSE_j = \sum_{\rho_i \in segment(j)} (\rho_i - \mu_j)^2$$

where $p_i$ is the substrate signature over the segment j and $\mu_j$ is its mean value over the that segment. The mean (or median) value of the SSE (or a factor or multiple of it) may be used as an atomic unit of encoding (a "digit"), to form an N-position string which is the substrate variance coding (SVC):

$$SVC_j = \|SSE_j / SSE_{mean}\|$$

where $\|.\|$ is a rounding function.

The substrate variance coding of any two substrate signatures may be compared using a distance function (SDED). An example of the distance function is:

$$SDED = \sum_j \min(|SVC_1(j) - SVC_2(j)|, T_{max})$$

where $T_{max}$ is an optional threshold to improve robustness. This distance function is a form of modified Hamming Distance, where the expected value of SVC(*) is 1 at each digit due to the normalization process. For example, a pair of SVCs (N=50) extracted from signatures for the same printed 'a' and their absolute difference are:
SVC1=11011111201101111211211121111110112121121-111010111
SVC2=11111111210100101211211121112110111111121-111011210
DIFF=00100000011001010000000000000100000010100-00000001101
for which the SDED is 11 (or 0.22 when normalized by N).

The SVC computed in this manner is able to provide forensic levels of authentication, where the probability of either failing to verify copies of the same document or erroneously matching different documents (false negatives and false positives respectively) is very low (e.g., the probability is less than one chance in a billion).

The following example is provided to illustrate an example of the forensic authentication system and method of the present disclosure. It is to be understood that this example is provided for illustrative purposes and is not to be construed as limiting the scope of the disclosure.

Example

Multiple paper types were selected, including 5 for laser printing (HP 80 g office, HP 160 g Matte, HP 200 g Photo Matte, HP 120 g Soft Gloss and Handmade Lokta by Wild Paper) and 3 for inkjet printing (HP 80 g office, HP Premium Photo Glossy and Handmade Lokta). The laser printer used was an HP CP6015 and the inkjet printer used was an HP K5400, and the printers were configured for the specific paper type being used.

For each print/paper-type combination, 40 Times Roman 12 point letter as were printed. Each printed "a" was scanned twice using similar but different high resolution imaging devices resulting in 640 individual images.

Two sets of experiments were performed, both of which utilized the printed letter "a" to define the printed and substrate regions. The first experiment utilized both the print and the substrate to provide a print signature, and the second experiment utilized only the substrate that was away from the intentionally inked part of the substrate to provide a substrate signature.

Figure 6:
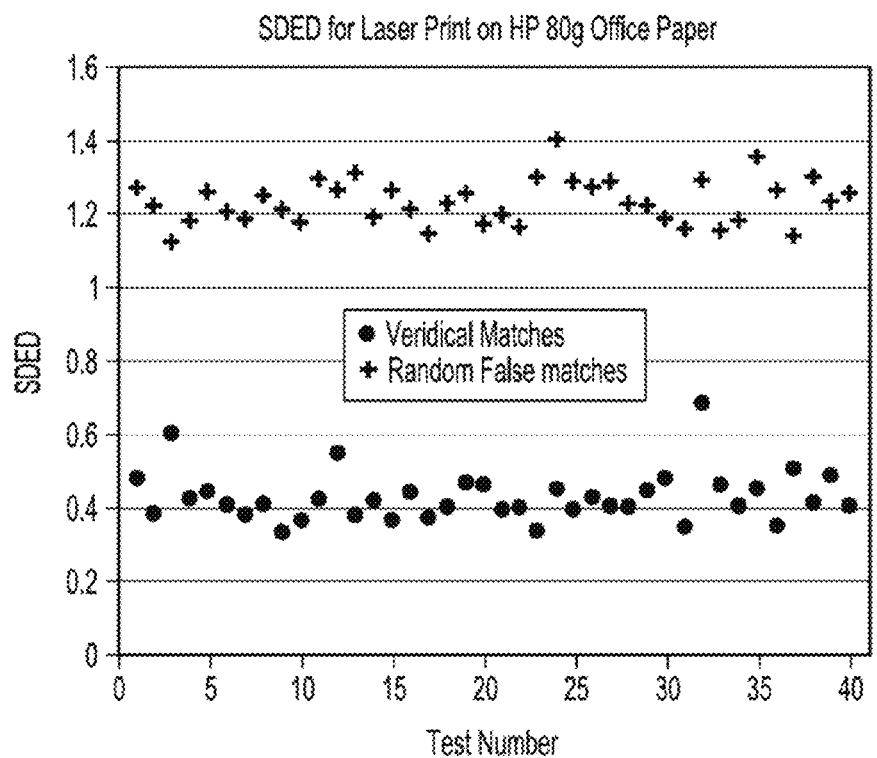
FIG. 6 is a graph depicting the distance function values (SDED) for veridical matches and random false matches for laser prints on HP 80 g office paper.

The first experiment involved superimposing a model on the image of the "a", defining a region utilizing loci along the normal vector for each individual contour point of the model, and calculating variance coding of the substrate and the printed part of the character (as described above, except that the calculations include data for the printed part of the character). The 40 SVC's derived from the printed letters captured by one high resolution imaging device were each compared with a VC derived from the same printed character captured with the other high resolution imaging device (veridical match) and with a random incorrectly matching VC (false match) also captured with the other high resolution imaging device (for the same print/substrate combination). The SDED values that resulted from one such experiment (laser on 80 g plain paper) are shown in FIG. 6. It is clear from this figure that the distribution of SDED values of the veridical matches is well separated from that of the false matches. The statistical separation of the two populations illustrated that the probability of false assertion (either positive or negative) is very low (e.g., less than 1 in $10^9$).

Figure 7:
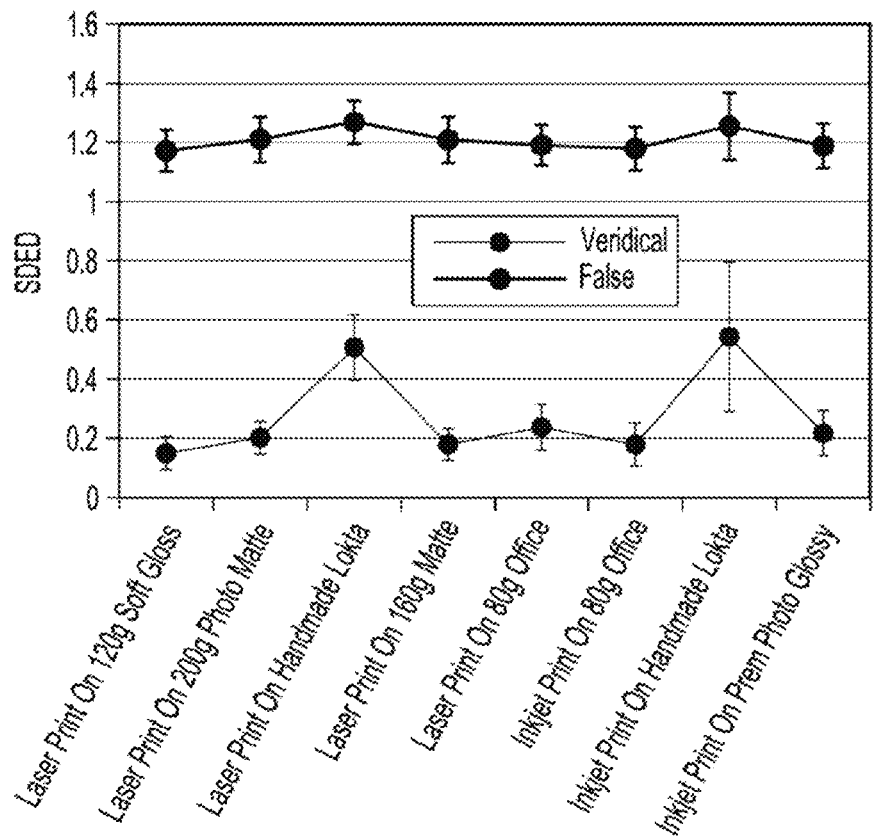
FIG. 7 is a graph of the first experiment mean SDED values and standard deviation error bars for veridical matches and random false matches for each paper/print combination used in the Example.

Summary statistics (means with standard deviation error bars) are shown in FIG. 7 for the 8 printer and paper combinations. Of these, the Handmade Lokta (for both laser and inkjet printing) alone showed significantly different distribution statistics to those illustrated in FIG. 6.

Figure 8:
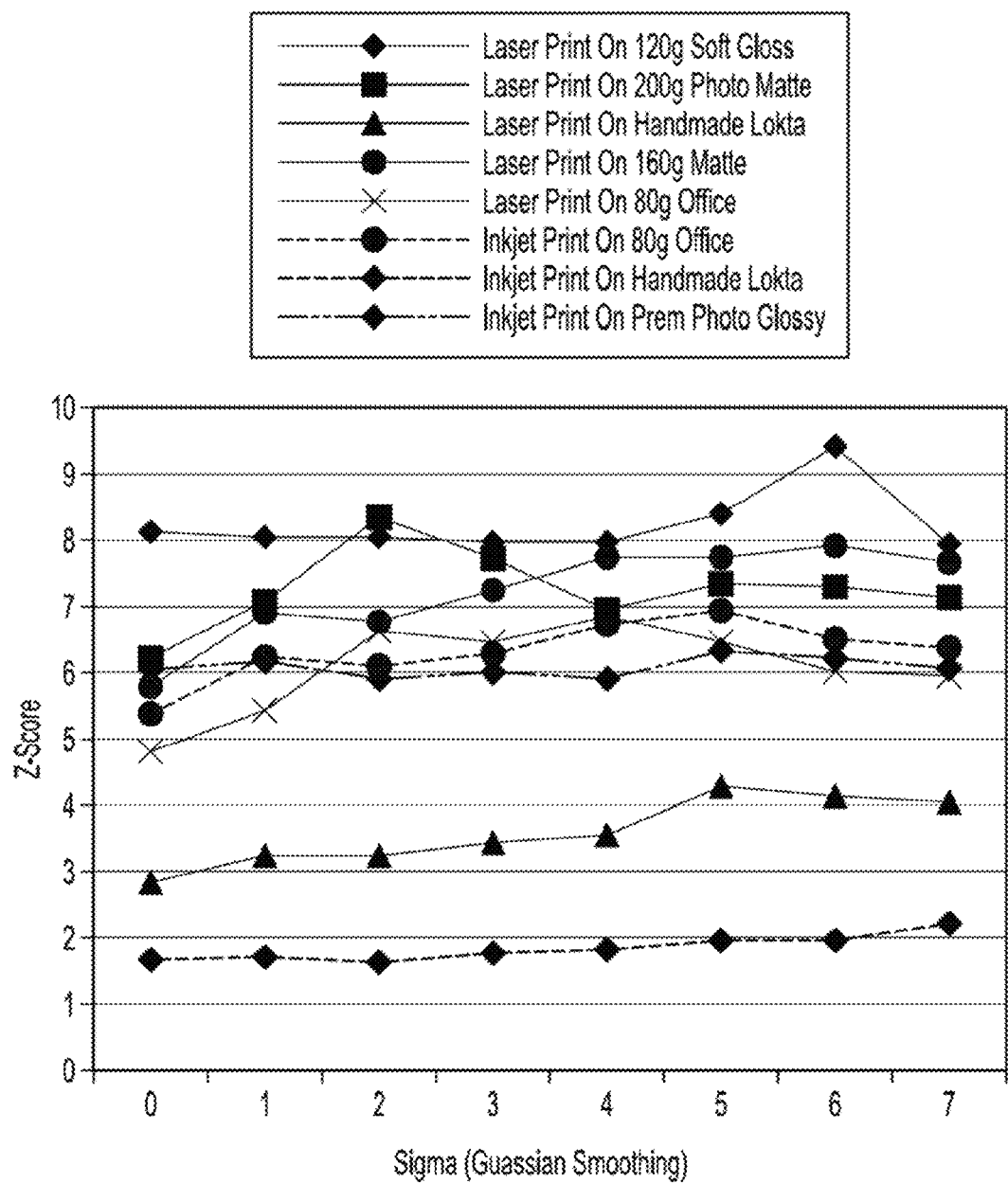
FIG. 8 is a graph of the first experiment approximate Z-score trend versus the Sigma used in low-pass filter for each paper/print combination used in the Example.

Assuming that the distributions of veridical and false matches are Gaussian, an approximate Z-score (approximate because these are small sample, rather than population, statistics) may be used to measure the separation of the two populations:

$$Z = |\vec{S}_V - \vec{S}_P| / (\sigma_V + \sigma_F)$$

that is the absolute difference of the mean SDED scores for veridical and false matches divided by the sum of their standard deviations. The relationship between Z-score and the probability of false-positive/negative is highly non-linear, while a Z-score of 3 corresponds to a probability of 0.001 and a Z-score of 6 relates to a probability of $10^{-9}$. FIG. 8 shows how approximate Z-scores varied with the degree of low-pass filtering applied to the image during the construction of the profile image. These results illustrated the advantage in overcoming sampling artifacts to achieve effective matching. It was noted that a sigma of 5.0 resulted in Z-scores above 6.0 for all but the handmade paper types.

The second experiment involved substrate-only comparisons using a modified form of the VC (i.e., the SVC described in the detailed description) where the SSE is replaced by the variance of the substrate in the top quartile of an extended profile image (chosen to ensure that the region over which the variance is measured is not close to the intentionally inked part of the print). Thus in the second experiment, the sole purpose of the model was to provide a unique frame of reference to allow consistent measurement of the substrate image.

Figure 9:
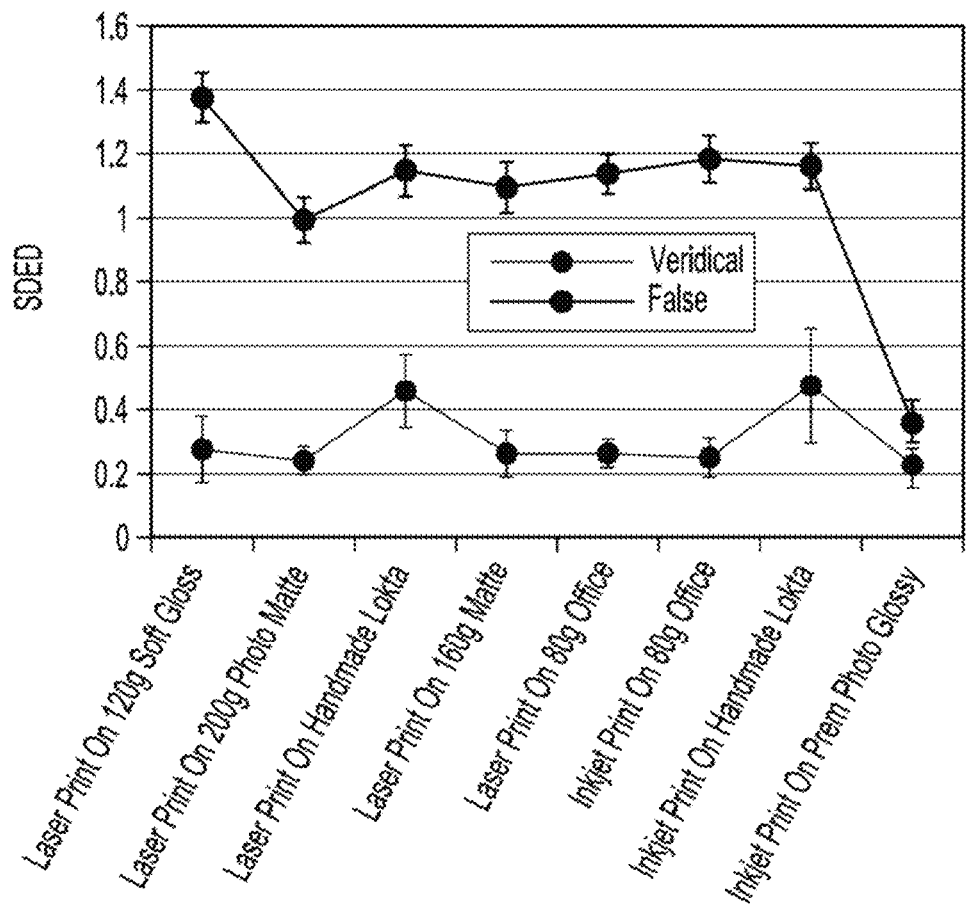
FIG. 9 is a graph of the second experiment mean SDED values and standard deviation error bars for veridical matches and random false matches for each paper/print combination used in the Example.

As mentioned above, the second experiment investigated the use of substrate variance alone to achieve forensic authentication. FIG. 9 shows summary statistics for each of the 8 paper types. These results are very similar to those shown in FIG. 7, which included both ink/toner and substrate in the region under analysis. The Premium Photo Glossy inkjet paper was significantly impaired in this experiment due to its highly uniform and specular surface properties.

Figure 10:
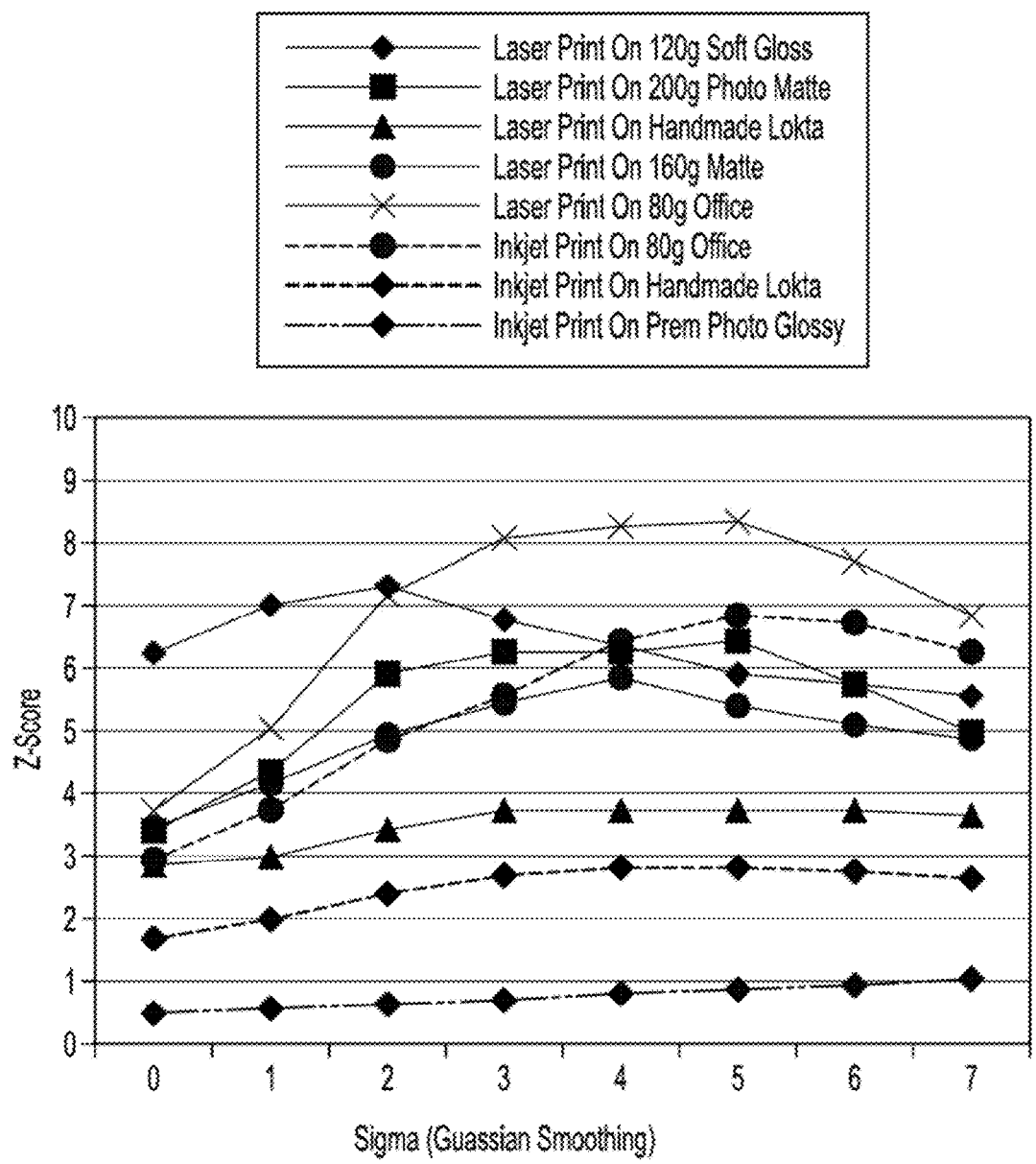
FIG. 10 is a graph of the second experiment approximate Z-score trend versus the Sigma used in low-pass filter for each paper/print combination used in the Example.

FIG. 10 illustrates the Z-score trend with the degree of low-pass filtering for the second (substrate alone) experiment. In this case, there are more significant relationships that are paper specific. It is noted that for laser printed documents the substrate inevitably includes flecks of stray toner that add to the microscopic texture used in the analysis of the images in the first experiment.

The results of the experiments showed that for the majority of print and substrate combinations forensic levels of authentication can be achieved with the analysis of a single image of a single printed glyph whether or not the ink/toner mass of the glyph is included in the analysis. In instances where the statistical significance is reduced it may be desirable to use a number of printed characters to achieve forensic-level identification. For example, if the probability of a false positive identification for a given character is p, and the desired forensic-level certainty is F, then n characters may be utilized to achieve forensic-level certainty governed by the equation:

$$p^n = F$$

As an example, if $p=0.022$ (as is the case for a Z-score of 2) and $F=10^{-9}$, then 6 characters (that is, $n=5.4$) may be utilized to achieve forensic-level validation.

The experimental results also illustrate that the SDED metric can be used as a quality assurance/quality control metric. As long as one knows he/she is looking at the same printed output, then a higher SDED value indicates a device issue rather than a false match. The experimental results also indicate that the system 20 and method disclosed herein may be suitable for analyzing a variety of substrates. However, it is believed that in some instances, substrates that have specular surface properties and/or that are devoid of surface texture may not be as suitable for use in the system 20 and method disclosed herein. Furthermore, it is also believed that the method may be more difficult to perform, for example, when printing technologies are used that result in ink splatter.

As mentioned above, the method(s) disclosed herein may be suitable at least for forensic-level quality assurance. It is believed that the method(s) disclosed herein may also be suitable to match marks taken in three or more images to qualify camera equipment, other quality assurance outcomes, etc.

It is to be understood that the ranges provided herein include the stated range and any value or sub-range within the stated range. For example, a range from 100 contour points to 2000 contour points should be interpreted to include not only the explicitly recited limits of 100 contour points to 2000 contour points, but also to include individual values, such as 250 contour points, 800 contour points, 1500 contour points, etc., and sub-ranges, such as from 500 contour points to 1900 contour points, from 1000 contour points to 1500 contour points, etc. Furthermore, when "about" is utilized to describe a value, this is meant to encompass minor variations (up to +/−10%) from the stated value.

Still further, it is to be understood that use of the words "a" and "an" and other singular referents include plural as well, both in the specification and claims.

While several examples have been described in detail, it will be apparent to those skilled in the art that the disclosed examples may be modified. Therefore, the foregoing description is to be considered non-limiting.

What is claimed is:

1. A forensic authentication system, comprising:
   an imaging device to capture an image of a printed mark and a non-printed area of a substrate outside of and directly adjacent to the printed mark; and
   a processor to run:
   computer readable instructions to determine a first plurality of points in the printed mark and a second plurality of corresponding points in the non-printed area based on predetermined information identifying the printed mark;
   computer readable instructions to, for each point in the first plurality, select a portion of the substrate between that point and a corresponding point in the second plurality;
   computer readable instructions to determine a region of the substrate that includes the portion of the substrate for each point in the first plurality; and
   computer readable instructions to generate a substrate signature for the region of the substrate based on a characteristic of the substrate inherent to the substrate, wherein the substrate signature is generated by calculating a measure of the characteristic at each of a plurality of predetermined locations in the region;
   wherein each of the computer readable instructions is embedded on a non-transitory, tangible computer readable medium.

2. The forensic authentication system as defined in claim 1 wherein the computer readable instructions to determine the region of the substrate include computer readable instructions to locate the printed mark in the image and align a previously stored outline of the printed mark with the printed mark; and wherein the predetermined information identifies the first and second plurality of points relative to a location of the outline.

3. The forensic authentication system as defined in claim 2 wherein the outline comprises coordinates of a plurality of contour points, the contour points indicative of an outer edge of the printed mark.

4. The forensic authentication system as defined in claim 3 wherein the computer readable instructions to determine the region of the substrate include:
   computer readable instructions to generate normal vectors for each contour point, the normal vectors perpendicular to the outer edge of the printed mark, wherein each point in the second plurality of points lies on a corresponding normal vector;
   computer readable instructions, for each point in the first plurality, to select a set of pixels between that point and the corresponding point in the second plurality as the portion of the substrate;
   computer readable instructions to construct a profile image by including each set of pixels as a column of pixels in the profile image, wherein the set of pixels are concatenated to form the column of pixels, and wherein the columns of pixels are concatenated to form the profile image; and
   computer readable instructions to select a predetermined portion of the profile image as the region of the substrate.

5. The forensic authentication system as defined in claim 4 wherein a height of the profile image is selected to be proportional to a size of the printed mark, and wherein the predetermined portion is a section of the profile image that is furthest from the printed mark and free of ink.

6. The forensic authentication system as defined in claim 1 wherein the processor further runs computer readable instructions to divide the substrate signature into a plurality of intervals, compute a statistical variance of the signature across each interval, and compute a coding of the substrate signature as a concatenation of the variances.

7. The forensic authentication system as defined in claim 1 wherein the processor further runs computer readable instructions to compute a distance function for comparing the substrate signature and another substrate signature.

8. The forensic authentication system as defined in claim 4 wherein the computer readable instructions to generate the substrate signature include computer readable instructions to compute an edge strength function to compare grayscale values for the pixels in each column, for each column, compute a sum of outputs from the edge strength function, and form the substrate signature from the sum for each column.

9. The forensic authentication system of claim 8, wherein the computer readable instructions to compute an edge strength function for the pixels include computer readable instructions to compute a digital derivate of grayscale values of the pixels.

10. The forensic authentication system of claim 4, wherein the normal vectors include at least two normal vectors non-parallel with each other, and wherein the profile image comprises a rectangular array of grayscale values.

11. A method to perform forensic authentication, comprising:
   receiving an image of a printed mark and a non-printed area of a substrate outside of and directly adjacent to the printed mark, wherein the printed mark comprises a character;
   determining a first plurality of points in the character and a second plurality of corresponding points in the non-printed area based on predetermined information identifying the character;
   for each point in the first plurality, selecting a portion of the substrate between that point and a corresponding point in the second plurality;
   selecting a region of the substrate that includes the portion of the substrate for each point in the first plurality; and
   generating a substrate signature for the region of the substrate based on a characteristic of the substrate inherent to the substrate, wherein the substrate signature is generated by calculating a measure of the characteristic at each of a plurality of predetermined locations in the region;
   wherein each element of the method is performed by a processor running computer readable instructions embedded on a non-transitory, tangible computer readable medium.

12. The method as defined in claim 11 wherein:
   determining the first and second plurality of points includes:
      finding a homographic transformation to align a plurality of contour points with an outer edge of the character,
      generating normal vectors for each contour point, the normal vectors perpendicular to the outer edge of the printed mark, and
      selecting each point in the first plurality of points as a point on a corresponding normal vector and each point in the second plurality of points as a point on the corresponding normal vector;
   selecting the portion comprises constructing a profile image by selecting the portion of the substrate for each point in the first plurality as a column of pixels in the profile image; and
   selecting the region comprises selecting a predetermined portion of the profile image free of ink as the region of the substrate.

13. The method as defined in claim 12 wherein the method further comprises low pass filtering the image.

14. The method as defined in claim 12 wherein generating the substrate signature includes computing an edge strength function for the pixels in each column, for each column, computing a sum of outputs from the edge strength function, and concatenating the sums for the columns to produce the substrate signature.

15. The method of claim 11, wherein the character comprises an alphanumeric character.

16. The method of claim 12, wherein selecting the predetermined portion of the profile image comprises selecting a predetermined percentage of the pixels in each column, wherein the selected pixels are farthest from the printed mark.

17. A non-transitory computer readable medium comprising instruction code, which when executed by a processor, causes the processor to:
   determine a first plurality of points in a printed mark in a captured image and a second plurality of corresponding points in a non-printed area of a substrate outside of and directly adjacent to the printed mark based on a stored indication of where the first plurality of points are located relative to the printed mark;
   for each point in the first plurality, select a column of pixels, the pixels lying on a vector extending from that point to a corresponding point in the second plurality;
   assemble a profile image comprising the columns of pixels for each point in the first plurality; and
   generate a substrate signature from at least a portion of the profile image based on a characteristic of the substrate inherent to the substrate, wherein the substrate signature is generated by calculating a measure of the characteristic at each of a plurality of predetermined locations in the profile image.

18. The non-transitory computer readable medium of claim 17, wherein the vector is perpendicular to an edge of the printed mark at the corresponding one of the first plurality of points, and wherein the second plurality of points are determined based on a size of the printed mark.

19. The non-transitory computer readable medium of claim 17, wherein the printed mark includes a curved edge and each vector along the curved edge includes an orientation distinct from other vectors along the curved edge.

* * * * *